Jan. 24, 1939.　　　　E. G. BEIDERMAN　　　　2,144,790
SPOT WELDER
Filed Sept. 21, 1935　　　　4 Sheets-Sheet 1

INVENTOR.
EDWARD G. BEIDERMAN
BY
Barnes, Kisselle, Laughlin Raisch
ATTORNEYS.

Jan. 24, 1939.   E. G. BEIDERMAN   2,144,790
SPOT WELDER
Filed Sept. 21, 1935   4 Sheets-Sheet 2

INVENTOR.
EDWARD G. BEIDERMAN
BY
Barnes, Kisselle, Laughlin Raisch
ATTORNEYS.

Jan. 24, 1939.  E. G. BEIDERMAN  2,144,790
SPOT WELDER
Filed Sept. 21, 1935  4 Sheets-Sheet 3

INVENTOR.
EDWARD G. BEIDERMAN
BY
Barnes, Kisselle, Laughlin Raisch
ATTORNEYS.

Jan. 24, 1939. E. G. BEIDERMAN 2,144,790
SPOT WELDER
Filed Sept. 21, 1935 4 Sheets-Sheet 4

INVENTOR.
EDWARD G. BEIDERMAN
BY
Barnes, Kisselle, Laughlin & Raisch
ATTORNEYS.

Patented Jan. 24, 1939

2,144,790

UNITED STATES PATENT OFFICE 2,144,790

SPOT WELDER

Edward G. Beiderman, Detroit, Mich., assignor to General Motors Corporation, Detroit, Mich., a corporation of Delaware Application September 21, 1935, Serial No. 41,515

14 Claims. (Cl. 219—4)

This invention relates to multiple or gang spot welders. There are a number of places where it is desirable to put work into a welder and rapidly spot weld the same by successive but rapidly delivered welds, for instance, this is a desirable way of welding the dash pan to the cowl of an automobile body, or it may be desirable to weld together some of the floor pans or the floor pans and the sills.

The broad idea of a gang welder for such purposes is old. It has already been proposed to do such work by hydraulic pressure, but machines of this kind have been rather troublesome by reason of the heavy pressures used and the necessity of absolutely secure packing. Packing has given a good deal of trouble. Furthermore, it has been thought necessary to provide a valve for each cylinder and a separate switch for turning on the primary current at the depression of each valve. Hence, each and every cylinder has a separate valve with a separate primary switch which multiplies the parts increasing the cost and increasing the liability of failure.

It is the object of the present invention to afford a machine using fluid pressure and in which a single distributor gives each cylinder its properly timed shot of fluid and in which a single primary switch is operated by fluid pressure every time a shot of fluid is given to a cylinder. This very much simplifies the apparatus and makes it much less open to difficulties that will hold up production. Again, the fluid pressure not only acts to switch on the current, but the fluid pressure also operates a timing cam. This does away with the expensive and the complicated electrical timing or current control devices that have heretofore been used with these multiple spot welders.

Figure 1:
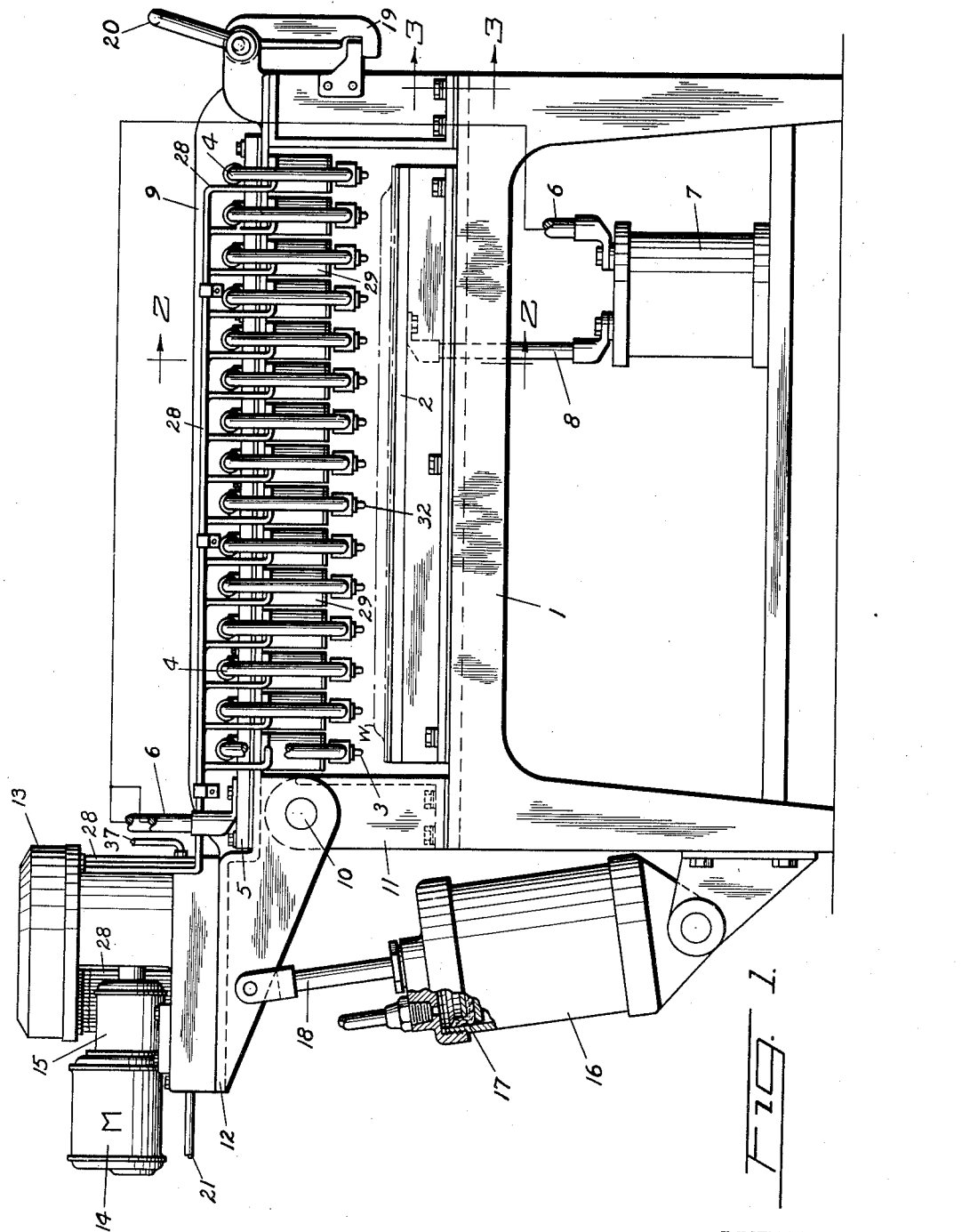
Fig. 1 is a front elevation of the machine.

The bed of the machine is designated 1. This supports one common electrode 2 and a plurality of electrodes 3. The latter may be in any number. Work is designated W in Fig. 2. The electrodes 3 are connected with a secondary conductor 5 by means of the flexible cables 4. This conductor is connected by the cable 6 with the transformer 7. The other end of the secondary connects by a cable 8 with the conductor 2. All the electrodes and the secondary conductor 5 are carried on a beam 9 of inverted T cross section. This beam is pivoted at 10 on an upright 11 which is secured to the bed 1 of the machine. A platform 12 forms a continuation of this pivoted beam and on this rests the distributor 13 and the electric motor M and the reducing gearing 15 which drives the distributor. An air cylinder 16 pivoted to the machine leg has a piston 17 that is connected by a rod 18 with this platform. By admitting air behind the piston, the pivoted beam together with all the electrodes may be swung up to allow insertion of the work. When the work is in place, a clamp 19 operated by a handle 20 may hold the beam in working position.

Air is supplied through the pipe 21 to an annular passageway 22, thence, through a port 23 to the passageway 24 which has a port 25 adapted to register with the narrow ends 26 of the staggered ports 27 on the face of the distributor plate. These ports are connected by pipes 28 with the numerous cylinders 29 and serve to drive down the pistons 30 against the springs 31 to force the electrodes 32 upon the work. At the time these ports register, the port 33 or port 33a leading to the passageway 34 registers with one of the ports 27 and air under pressure travels through the passageway 34 to the annular passage 36, thence through the pipe 37, and finally to the cylinder 38 (Fig. 10) where it serves to force up the piston 39. This forces up the cam 40 and throws the switch 41 closing the circuit through the primary coil of the transformer 42. The length of the primary coil may be varied by rotating the bridge 43 to the various stations shown in Fig. 10.

Figure 7:
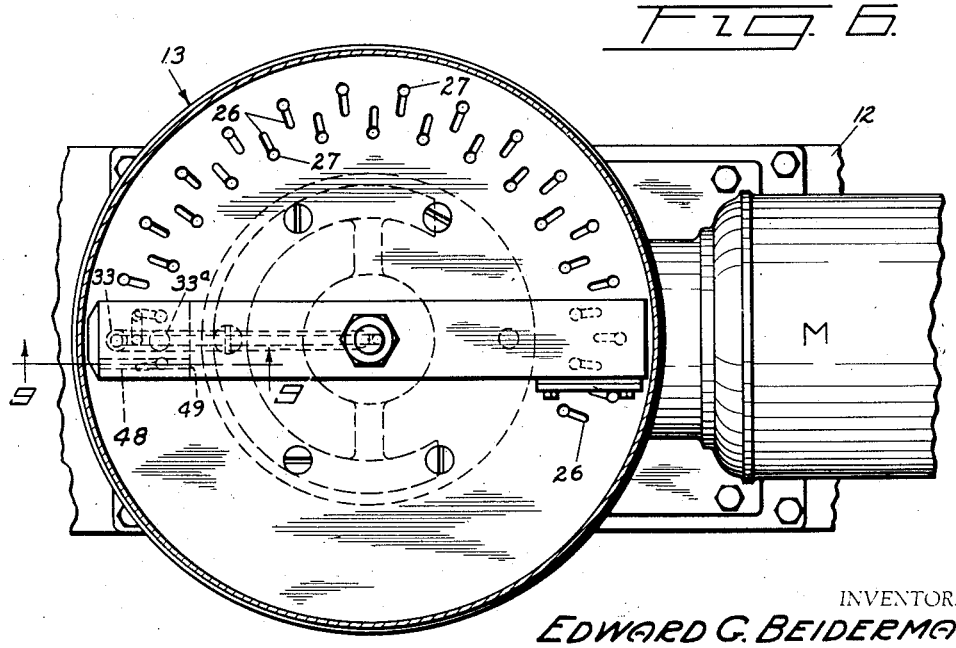
Fig. 7 is a section on the line 7—7 of Fig. 6.
Figure 8:
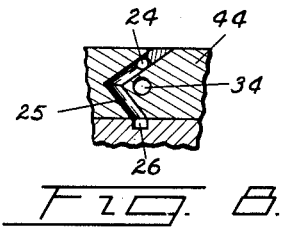
Fig. 8 is a section on the line 8—8 of Fig. 6.
Figure 9:
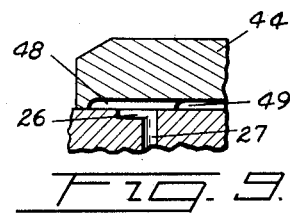
Fig. 9 is a section on the line 9—9 of Fig. 7.

As the distributor arm 44 is rotated by the miter gears 45 and 46, reduction gearing 15 and the electric motor M, the exhaust passage 48 (Fig. 7 and Fig. 9) comes into registry with the last port 27 through which air has been shot. This passage opens up a connection to the atmosphere at 49 (Fig. 9) and relieves the pressure behind the piston 30 and the spring 31 returns the electrode to its inoperative position. The current has already been cut off when the valve 50 (Fig. 10) rises so that the passageway 51 registers with the ports 52. This releases the pressure behind the cam and the spring 53 returns the piston that operates the cam to its initial position.

Figure 2:
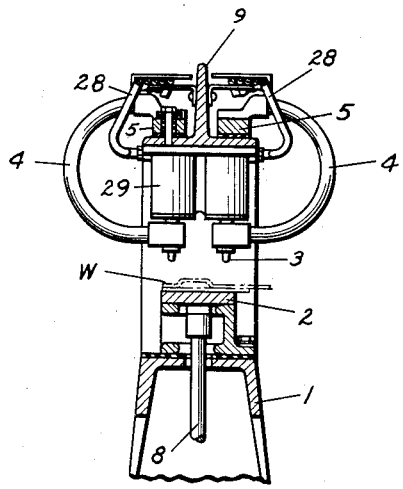
Fig. 2 is a vertical cross section on the line 2—2 of Fig. 1.
Figure 3:
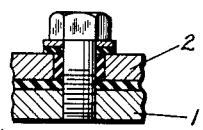
Fig. 3 is a section on the line 3—3 of Fig. 1.
Figure 4:
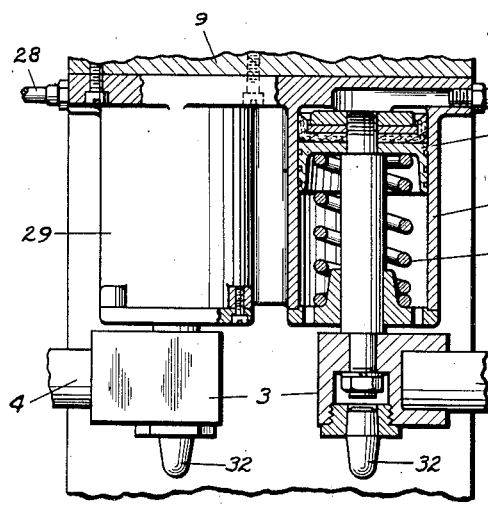
Fig. 4 is an enlarged fragmentary view partly in section showing the electrodes and control cylinders.
Figure 5:
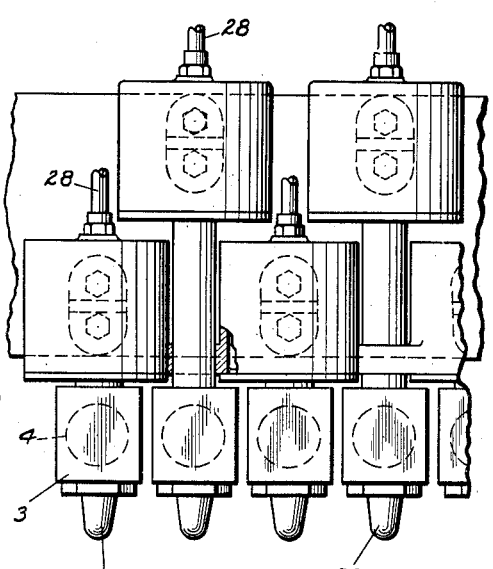
Fig. 5 is a view of a modified form in which the cylinders are arranged in staggered relation to pack more electrodes in a given space.
Figure 6:
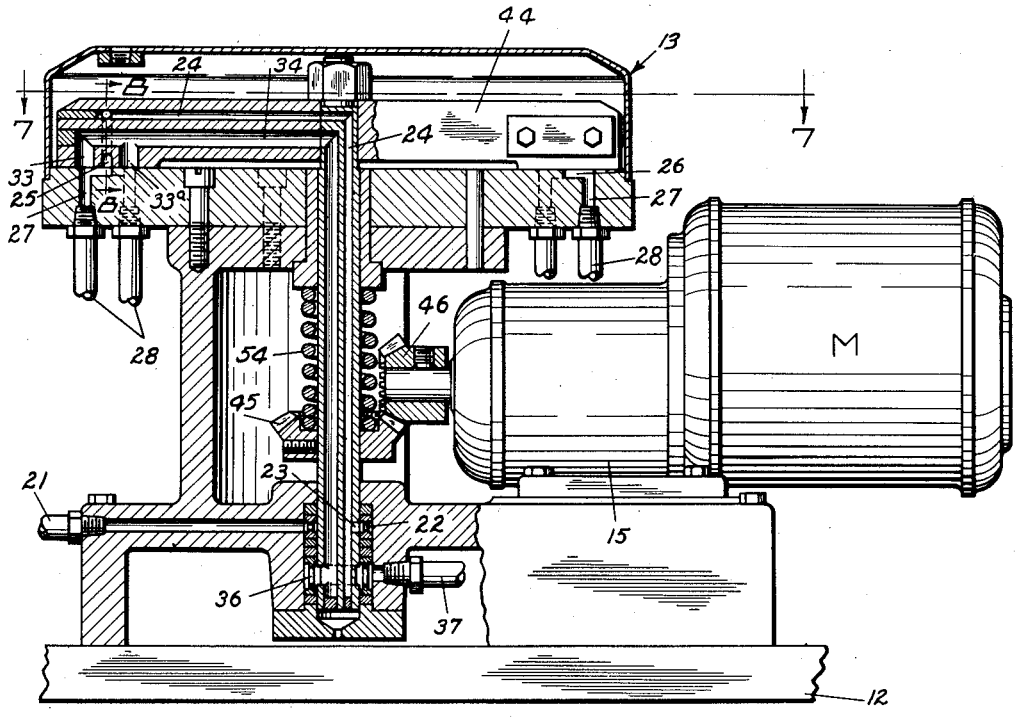
Fig. 6 is a vertical section of the distributor.

In Fig. 5, in counter-distinction to the arrangement shown in Figs. 1 and 2, two rows of cylinders are provided on each side of the machine, one above the other, and the cylinders arranged in staggered position to permit the electrodes to be packed in closer arrangement for the purpose of cutting down the space between the welds.

Spring 54 keeps the distributor arm 44 tightly to the face of the distributor face. This distributor arrangement including the staggered arrangement of the ports 27 permits a very large number of electrode cylinders to be controlled in a very limited space and by mechanism of minimum simplicity. The distributor is so designed that it is practically impossible for it to get out of order as distinguished from control arrangements which have a plurality of switches one for each cylinder. The registering ports of distributor arm and distributor face obviously eliminate all valve difficulties and a single timing switch minimizes the possible electrical difficulty.

Figure 10:
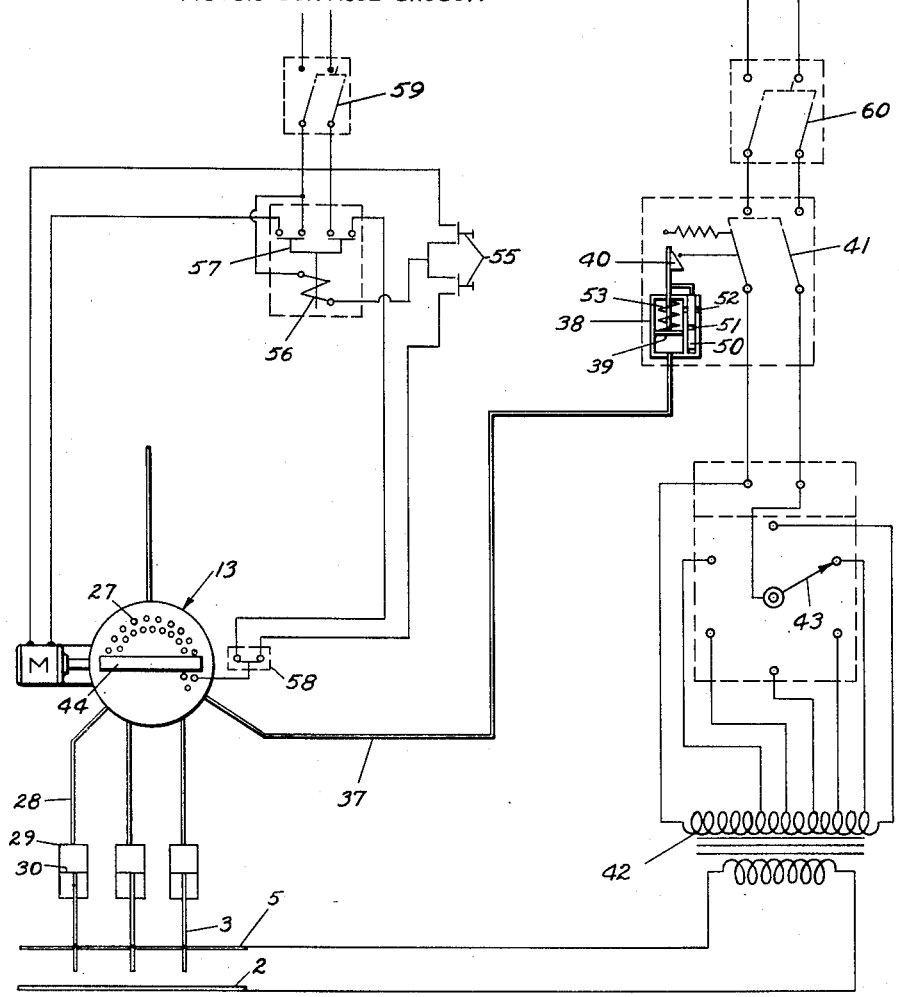
Fig. 10 is a diagrammatic view of the wiring and the air connections.

The motor M is controlled by the switch 55 (Fig. 10). This energizes solenoid 56 which closes the switch 57 to the motor M. 58 is a limit switch so as to cut out the motor current when the distributor arm has traveled over all the ports leading to the electrode cylinders. 59 is a line switch for the motor circuit. 60 is a line switch for the welding circuit.

What I claim is:

1. In a multiple spot welder, the combination of a plurality of electrode sets, a fluid cylinder and piston for one electrode of each set, a source of fluid pressure, a distributor, separate conduits leading from said distributor to each cylinder, said distributor comprising a moving member having a port charged with a compressed fluid, and arranged to successively register with the opening of each conduit to distribute the fluid successively to each cylinder.

2. In a multiple spot welder, the combination of a plurality of electrode sets, a fluid cylinder and piston for one electrode of each set, a source of fluid pressure, a distributor for successively distributing fluid to the fluid cylinders, said distributor comprising a distributor plate provided with ports having passageways connecting with the respective cylinders and a moving distributor arm carrying passageways charged with compressed fluid and successively connecting the fluid source with the respective cylinders.

3. In a multiple spot welder, the combination of a plurality of electrode sets, a fluid cylinder and piston for one electrode of each set, a source of fluid pressure, and a distributor for successively distributing fluid to the fluid cylinders, said distributor comprising a distributor plate provided with ports having passageways connecting with the respective cylinders and a rotating distributor arm having a substantially fluid tight wiping engagement with said plate and having passageways successively connecting the fluid source with the respective cylinders.

4. In a multiple spot welder, the combination of a plurality of electrode sets, a fluid cylinder and piston for one electrode of each set, a source of fluid pressure and a distributor for successively distributing fluid to the fluid cylinders, said distributor comprising a distributor plate provided with ports having passageways connecting with the respective cylinders and a moving distributor arm having passageways charged with compressed fluid and for successively connecting the ports leading to the cylinders with the source of fluid and then for exhausting.

5. In a multiple spot welder, the combination of a plurality of electrode sets, a fluid cylinder for one electrode of each set, a source of compressed fluid, an electric switch for controlling the primary circuit, a distributor for successively connecting each of the cylinders with the source of compressed fluid, fluid operated means for controlling the primary switch, and connections between the source of fluid and said fluid-operated means for successively and in properly timed relation throwing the primary switch when the electrode has been pressed upon the work.

6. In a multiple spot welder, the combination of a plurality of electrode sets, a fluid cylinder for one electrode of each set, a source of compressed fluid, an electric switch for controlling the primary circuit, a distributor for successively connecting each of the cylinders with the source of compressed fluid, fluid-operated means for controlling the primary switch, and connections between the source of fluid and said fluid-operated means for successively and in properly timed relation throwing the primary switch when each electrode has been pressed upon the work, the said fluid-operated means controlling the primary switch provided with devices for opening the primary circuit at the proper time.

7. In a multiple spot welder, the combination of a plurality of electrode sets, a fluid cylinder for one electrode of each set, a source of compressed fluid, an electric switch for controlling the primary circuit, a distributor for successively connecting each of the cylinders with the source of compressed fluid, fluid-operated means for controlling the primary switch, and connections between the source of fluid and said fluid-operated means for successively and in properly timed relation throwing the primary switch when each electrode has been pressed upon the work, the said fluid-operated means controlling the primary switch provided with devices for opening the primary circuit at the proper time, comprising a cam that closes the primary switch actuated by a piston and an air cylinder and a relief valve that is opened after a given traverse of the piston.

8. In a multiple spot welder, the combination of a plurality of electrode sets, a fluid cylinder for one electrode of each set, a source of compressed fluid, an electric switch for controlling the primary circuit, a distributor and distributor arm for successively connecting each of the cylinders with the source of compressed fluid, fluid-operated means for controlling the primary switch, and connections between the source of fluid and said fluid-operated means through the distributor and distributor arm for successively and in properly timed relation throwing the primary switch when each electrode has been pressed upon the work, the said fluid operated means controlling the primary switch provided with devices for opening the primary circuit at the proper time.

9. In a multiple spot welder, the combination of a plurality of electrode sets controlled by separate electrode cylinders and pistons and a source of compressed fluid, with a distributor for giving successive compressed fluid shots to the said cylinders comprising a rotating arm provided with a fluid passageway for connecting with the fluid source having a discharge port and a second passageway having a port located behind the first mentioned discharge port and leading to a point of discharge, a distributor plate over which the arm rotates in substantially fluid tight wiping relation and provided with ports connected with the separate electrode cylinders and with which the ports of the two passageways in the distributor arm are arranged to successively register.

10. In a multiple spot welder having a plurality of electrode sets controlled by separate fluid cylinders, pistons, a source of compressed fluid, and a fluid controlled primary switch provided with a pneumatically operated actuator, a distributor comprising a distributor plate provided with a plurality of ports, each port leading to one of said fluid cylinders and a rotary distributor arm having a passageway through the arm and connected with the source of compressed fluid for successively registering with the ports through the distributor plate, said arm having a second passageway which connects with the fluid source and said actuator for the primary switch when the fluid pressure is delivered into a port leading to the electrode cylinder thereby to actuate the primary switch in timed relation with the closing of each successive electrode onto the work.

11. In a multiple spot welder having a plurality of electrode sets controlled by separate electrode cylinders, pistons, a source of compressed fluid and a fluid controlled primary switch provided with a fluid operated actuator, a distributor comprising a distributor plate provided with a plurality of ports, each port leading to one of said fluid cylinders and a rotary distributor arm having a passageway through the arm and connected with the source of compressed fluid for successively registering with the ports through the distributor plate, said arm having a second passageway which connects with the fluid source and said actuator for the primary switch when the fluid pressure is delivered into one of the ports leading to the electrode cylinder thereby to actuate the primary switch in timed relation with the closing of electrodes on the work, said connection comprising an elongation of the port in the distributor plate leading to the electrode cylinder which is arranged to register with the passageway leading to the actuator of the primary switch.

12. In a multiple spot welder, the combination of a plurality of electrode sets, a fluid cylinder and piston for one electrode of each set, a source of fluid pressure, a distributor having a moving member charged with a compressed fluid for successively distributing fluid to and exhausting the fluid from the fluid cylinders and separate conduits connecting the distributor and each cylinder through which fluid successively passes for delivery and exhaustion.

13. In a multiple spot welder, the combination of a plurality of electrode sets, a fluid cylinder and piston for one electrode of each set, a source of fluid pressure, and a distributor for successively distributing fluid to the fluid cylinders, said distributor comprising a distributor plate provided with ports having passageways connecting with the respective cylinders and a rotating distributor member having a substantially fluid tight wiping engagement with said plate and having a passageway for successively connecting the fluid source with the respective cylinders.

14. In a multiple spot welder, the combination of a plurality of electrode sets, a fluid cylinder and piston for one electrode of each set, a source of fluid pressure, a distributor, separate conduits leading from said distributor to each cylinder, said distributor comprising a moving member having a port arranged to successively register with the opening of each conduit to distribute the fluid successively to each cylinder.

EDWARD G. BEIDERMAN.